_United States Patent Office_

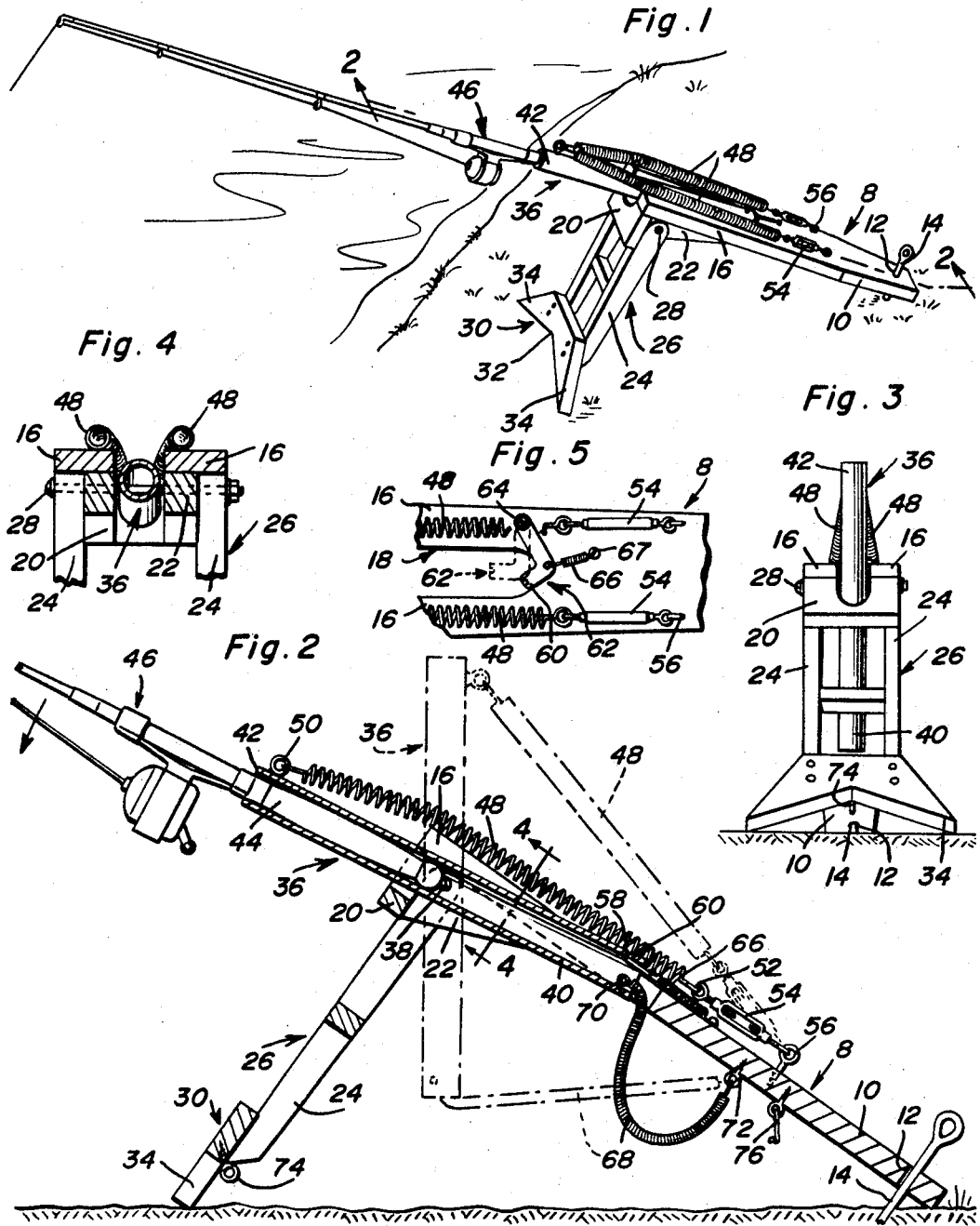

3,475,847
Patented Nov. 4, 1969

3,475,847
UNATTENDED FISH HOOKER AND CATCHER
Nathaniel Wilson, 252 Orchard,
Xenia, Ohio 45385
Filed May 29, 1968, Ser. No. 733,015
Int. Cl. A01k 97/10
U.S. Cl. 43—15    10 Claims

ABSTRACT OF THE DISCLOSURE

An automatic-type fish hooker characterized by a portable folding dual-leg stand supporting a tubular pivoted spring-loaded rod holder. This holder receives the handle of a rod and when set is releasably retained by pivoted spring-tripped L-shaped latch. When the fish takes the hook, the holder tips up, forcibly yanks the line, sets the baited fishhook, and makes the desired catch is a manner similar to prior art hookers and catchers.

---

This invention relates to unattended automatic hookers and catchers and has to do, more particularly, with a self-supporting stand which is easy to erect for use, has novel folding legs wherein a main leg is equipped with the pivoted rod holder and the auxiliary but companion leg serves as a fold-away prop for the elevated forward end of the main leg.

Unattended automatic-type fish hookers and catchers, as known to persons conversant with this field of endeavor, are of many and varied types and forms. With the subject matter of the instant invention in mind, it can be pointed out, for general background purposes, that it is common practice to provide a portable stand or support of one type or another and to equip the same with a spring-loaded rod holder which can be set in a ready-to-operate position by a trippable trigger or catch. The holder is forcibly actuated by spring means. When the holder is tipped down and then caused to swing forcibly upward, it yanks the line, sets the hook and makes the catch in a generally well-known manner. The patent to Sibley, 1,957,853, covering a so-called automatic fish striker may be referred to, if desired, as exemplary prior art.

Briefly, the improved adaptation herein under advisement is characterized by a portable leg stand made up of a rearward first or primary leg and a companion auxiliary leg. Upper ends of the legs converge cooperatively and are joined together. The first or rearward leg has a lower end portion adapted to be temporarily anchored in a given place on a bank or other relatively stationary support surface. The second-named or forward leg has a foot to rest appropriately on the support surface. An elongated rod holder is pivotally mounted intermediate its ends atop the stand and it has a forward end to which a fishing rod is removably attached. The rearward end of the rod holder is provided with a keeper hole. A latch dog is pivotally mounted on the rearward leg and has a detent capable of being releasably connected with the keeper hole in a manner to hold the rod holder in a ready-to-act position. Coil spring means is provided and has a forward end operatively secured to the forward end of the rod holder and a rearward end which is fastened on a median portion of the rearward leg.

In carrying out a preferred embodiment of the invention the forward leg comprises a leg frame having legs which are pivotally joined with ribs on the forward portion of the rearward leg in a manner to provide a foldable and compact and convenient structure. The rearward leg can be staked down to assist in holding the stand in a given position. The coil springs which spring the holder to upright position have rearward ends adjustably joined with the rearward leg. Other features and advantages will be hereinafter set forth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of an unattended fish hooker and catcher constructed in accordance with the invention and showing the same set up for use.

FIG. 2 is a central longitudinal sectional view on a suitably enlarged scale with parts in section and elevation and taken on the plane of the section line 2—2 of FIG. 1.

FIG. 3 is a front end view with the fishing rod removed and the rod holder in its tripped position.

FIG. 4 is a section on a suitably enlarged scale and fragmentarily shown and taken on the plane of the section line 4—4 of FIG. 2.

FIG. 5 is an enlarged fragmentary detail view of the median portion of the primary or rearward leg of the stand with certain parts omitted to bring out the construction of the spring-biased latch.

And FIG. 6 is an edge or side elevational view based on FIG. 1 and showing the stand collapsed or folded in readiness for carrying and storage.

The stand is primarily made up of legs and is substantially of inverted V-shaped form when being used in the manner shown in FIGS. 1 and 2. The first or primary leg is denoted by the numeral 8 and is of suitable size and material and of the elongate shape and approximate size shown for example in FIG. 1. The right hand or rearward end (FIGS. 1 and 2) is denoted at 10 and is provided with a suitable hole 12 for reception and retention of a holddown pin 14 also designated as a stake. The left hand or forward end portion of the leg 8 is bifurcated to provide a pair of duplicate spaced parallel coplanar furcations 16 which define an elongated notch or slot denoted at 18. The forward end of this notch opens through the extreme forward end of the leg 8 as is evident from FIGS. 1 and 2. It will be noted that there is a suitably-proportioned centrally-notched cleat 20 which is fastened to the forward ends of the furcations 16 and which is stabilized by bracing ribs 22. The cleat 20 serves not only to rigidify the structure but also provides a limit stop for the spaced parallel components 24 of the auxiliary or forward leg 26. For distinction of description this part 26 is also referred to as a leg frame and it will be seen that the upper ends of the legs 24 are pivotally mounted at 28 on the ribs 22. A block 30 bridges the lower ends of the legs 24 and is fastened thereto and has a centrally notched portion 32 and pointed terminal ends 34 thus providing a ground-engaging foot. When the two legs 8 and 26 are in stand-forming relationship the upper pivoted ends of the legs 24 abut the cleat 20 thus maintaining the respective legs in their desired stand relationship.

The rod holder is denoted generally by the numeral 36 and comprises an open-ended tube. The median or central portion of the tube is pivotally mounted on the pivot pin 28 in the manner indicated at 38 in FIG. 2. When the rod holder is set for use the right-hand half portion 40 is fitted into the slot 18 between the furcations 16. At the same time the forward half portion 42 projects beyond the stand and provides a socket for the handle portion 44 of the attachable and detachable fishing rod 46.

The spring-loading means for the tubular rod holder preferably comprises a pair of duplicate elongated coil springs 48 which have forward ends suitably connected at 50 to the end portion 42 of the rod holder as best shown in FIG. 2. The rearward ends 52 are connected to turnbuckles 54 which in turn are joined by screw eyes 56 to the upper side of the median portion of the downwardly inclined rear leg 8. It will be noted in FIG. 2 that the rearward end portion of the rod holder is provided with a keeper hole 58 which is constructed and arranged to accommodate a lateral detent 60 on the short arm (FIG. 5) of an L-shaped latch dog 62. The long arm of the latch dog is pivotally anchored in operative position as at 64 adjacent the cooperating end of the slot 18. The numeral 66 designates a suitably tensioned spring which has one end 67 anchored on the rear leg and the other end joined to the junctional portion between the long and short legs of the trippable latch dog 62.

Means is provided for checking the forward swinging motion of the rearward half portion of the rod holder and preferably comprises a suitably tensioned coil spring 68 (FIG. 2) which has one end 70 connected with the rearward half portion 40 of the rod holding tube. The other end portion 72 is anchored on the underneath side of the rearward leg. Manifestly, when the holder is in the set position shown in FIGS. 1 and 2 the check spring 68 is slack. When, however, the line is pulled and the latch dog 62 is released, the spring 68 comes into play and provides a simple shock-absorber as brought out in phantom lines in FIG. 2.

The leg frame 26 is provided at its bottom with a screw eye 74 (FIG. 2) with which a pivoted hook 76 is conveniently and releasably connectible. This hook 76 and eye 74 come into play when the stand is collapsed or folded in the manner shown in FIG. 6.

To properly use the invention, a light spinner (not shown) is employed and the drag means on the fishing rod is set with approximately six pounds cast-out line. The handle of the rod is inserted into the holder and the rod holding portion is pulled down to and beyond the front of the stand. The detent 60 of the latch dog 62 is engaged with the keeper hole 58 in the manner shown in FIG. 2 thus stretching the return spring 66 and also putting the two companion coil springs 48 under satisfactory ready-to-function position. When a fish strikes the hook on the fishing line, the fishing rod 46 is flexed in a manner tending to move the forward end 42 of the rod holder 36 downwardly and the rearward end 40 upwardly. This upward movement of the rearward end of the rod holder overcomes the resistance of the detent 60 engaged therewith and the said detent becomes disengaged from the keeper hole 58. The two coil springs 48 now function to pull the rod holder 36 to an upright position, as depicted in phantom lines in FIGURE 2, which movement yanks the line and sets the baited hook in the mouth of the fish.

It will be evident that FIGS. 1 and 2 show not only the over-all construction of the stand but the manner in which the pole is inserted and held and the holder is set and latched in readiness for use. As a matter of fact, FIG. 2 shows the slack check spring 68 and in phantom lines the manner in which it comes into play when the rod holder is forcibly swung from a full line to the phantom line position illustrated. FIG. 5 shows the details of the spring-adjusting turnbuckles and the spring-biased latch dog 62. The manner in which the parts are collapsed and folded for carrying is illustrated in FIG. 6. It is believed therefore that a more extended description of the invention and the manner of use is apparently unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An unattended automatic fish hooker and catcher comprising, in combination, a portable leg stand having a rearward primary leg and a forward auxiliary leg having upper ends cooperatively joined together, said rearward leg having a lower end portion adapted to be temporarily anchored in a given place on a relatively stationary support surface, said forward leg having a complemental foot adapted to rest in a set position atop said support surface, an elongate rod holder pivotally mounted intermediate its ends atop said stand and having a forward end to which a fishing rod is removably attached and a rearward end provided with a keeper hole, a latch dog pivotally mounted on said rearward leg and having a detent releasably connectible with said keeper hole, and coil spring means having a forward end operatively secured to the forward end of said rod holder and a rearward end fastened on a median portion of said rearward leg.

2. The fish hooker and catcher defined in and according to claim 1, and wherein said stand is of inverted V-shaped form, said legs having outwardly and downwardly diverging and upwardly converging relationship, the upper ends being pivotally joined whereby the respective legs can be folded and collapsed for compact convenient handling, and storage.

3. The fish hooker and catcher defined in and according to claim 2, and wherein said auxiliary leg is characterized by a leg frame embodying a pair of spaced legs having lower ends carrying a fixed block, said block defining a surface engaging foot.

4. The fish hooker and catcher defined in and according to claim 2, and wherein said auxiliary leg is characterized by a leg frame embodying a pair of spaced legs having lower ends carrying a fixed block, said block defining a surface engaging foot, and wherein the rearward end of said primary leg has a prepared hole therein for reception and retention of a suitably cooperable holddown and staking pin.

5. The hooker and catcher defined in and according to claim 1, and wherein said latch dog is L-shaped in plan and embodies long and short legs, the long leg being pivotally mounted, and a latch tripping and detent disengaging coil spring having one end joined to said latch dog at the juncture of the long and short legs and its other end fastened atop a cooperating surface of said primary leg.

6. The hooker and catcher defined in and according to claim 1, and, in combination, means for checking the forward swinging motion of the rearward half-portion of said rod holder comprising a coil spring having one end secured to a median portion of said primary leg and the other end secured to a coacting rearward end of said rod holder.

7. An unattended automatic-type fish hooker and catcher comprising, in combination, an inverted V-shaped stand having an elongate rearward primary leg and a complemental forward auxiliary leg, said primary leg having a rearward end with a holddown stake pin hole therein, the forward end of said primary leg being bifurcated and providing a pair of spaced parallel furcations with an elongated clearance notch therebetween, the forward end of said notch opening through the coordinating forward end of said primary leg, said forward end having a fixed lateral depending reinforcing cleat with rigidifying ribs secured thereto and to an adjacent underneath side of said primary leg, said cleat providing a limit stop, a forward auxiliary leg comprising a leg frame having a pair of legs with upper ends straddling and hingedly connected to said rigidifying ribs and normally abutting said limit stop cleat, a V-notched block fixed across lower ends of said legs and providing a ground-engaging foot, a rod holder comprising an elongated tube pivotally and swingably mounted intermediate its ends between the forward ends of said furcations, a rearward half-portion of said tube being nested between the furcations and the forward half-portion projecting beyond said furcations when the hooker is manually set to catch fish, said tube being provided at its rearward end with a keeper hole, a latch dog pivotally mounted on said rearward leg and having a detent releasably connectible with said keeper hole, and coil spring means having a forward end operatively secured to the forward end of said rod holder and a rearward end fastened on a median portion of said rearward leg.

8. The hooker defined in and according to claim 7, and wherein said latch dog is L-shaped in plan and embodies a pivotally mounted long leg and a short leg terminating in a detent and releasably engageable with said keeper hole, a trip spring having one end secured atop said rearward leg and its other end operatively secured to said latch dog.

9. The hooker defined in and according to claim 8, and wherein said coil spring means comprises a pair of companion coil springs having forward ends oriented with said tube and rearward ends adjustably anchored on a coacting medium portion of said rearward leg.

10. The hooker and catcher defined in and according to claim 9, and, in combination, means for checking the forward swinging motion of the rearward half-portion of said rod holder comprising a coil spring having one end secured to a median portion of said primary leg and the other end secured to a coacting rearward end of said rod holder.

References Cited

UNITED STATES PATENTS

| | | | |
|---|---|---|---|
| 2,618,090 | 11/1952 | Kimura | 43—15 |
| 2,803,911 | 8/1957 | Hollingsworth | 43—15 |
| 2,898,697 | 8/1959 | Housman | 43—15 |

SAMUEL KOREN, Primary Examiner

D. J. LEACH, Assistant Examiner